United States Patent [19]
Fernandez

[11] 3,744,490
[45] July 10, 1973

[54] AUTOMATIC DEVICE FOR RECORDING BLOOD PRESSURE

[76] Inventor: Heriberto S. Fernandez, 1822 Gaston St., Winston-Salem, N.C. 27103

[22] Filed: Nov. 16, 1971

[21] Appl. No.: 199,103

[52] U.S. Cl. ................... 128/2.05 A, 128/2.05 Q
[51] Int. Cl. .............................................. A61b 5/02
[58] Field of Search ............... 128/2.05 A, 2.05 C, 128/2.05 M, 2.05 Q, 2.05 R, 2.05 S

[56] References Cited
UNITED STATES PATENTS

| | | | |
|---|---|---|---|
| 2,447,018 | 8/1948 | Keinath | 128/2.05 Q |
| 3,156,237 | 11/1964 | Edmark, Jr. | 128/2.05 R |
| 3,550,582 | 12/1970 | Wilhelmson | 128/2.05 A |
| 3,486,499 | 12/1969 | Yen | 128/2.05 Q |
| 1,481,084 | 1/1924 | Dressler | 128/2.05 Q |
| 2,710,001 | 6/1955 | Freybergen | 128/2.05 M |
| 2,989,051 | 6/1961 | Zuidema et al. | 128/2.05 Q |
| 3,552,385 | 1/1971 | Jannsen | 128/2.05 M |

FOREIGN PATENTS OR APPLICATIONS

| 1,466,901 | 2/1969 | Germany | 128/2.05 M |
|---|---|---|---|

*Primary Examiner*—William E. Kamm
*Attorney*—John W. Malley, James R. Longacre et al.

[57] ABSTRACT

An apparatus for producing a record of systolic and diastolic blood pressure for one or more individuals whereby an inflatable blood pressure cuff is conventionally placed on a part of the body such that inflation of the cuff constricts blood flow and causes the Korotkoff sounds to appear at roughly the diastolic pressure and disappear at roughly the systolic pressure and inflated under the control of an electrical impedance detector which, for example, may be placed on one or two digits and which detects the pulsating impedance which continues until a pressure is reached which is beyond the systolic pressure and at this pressure the cuff is automatically deflated. A transducer such as a microphone is placed, for example, under the cuff to detect the Korotkoff sounds and produce a pulse train as long as these sounds are detected. This Korotkoff signal is recorded on a conventional graphic recorder together with a signal generated, for example, by a strain gauge which indicates the cuff pressure such that the systolic and diastolic pressures both during inflation and deflation can be ascertained from the beginning and end of the pulse train superimposed on the recorded cuff pressure signal. This device can be used with one cuff transducer or simultaneously with a plurality of cuffs and transducers to simultaneously produce on different channels of a graphic recorder a record of the systolic and diastolic blood pressures of a number of different individuals.

7 Claims, 3 Drawing Figures

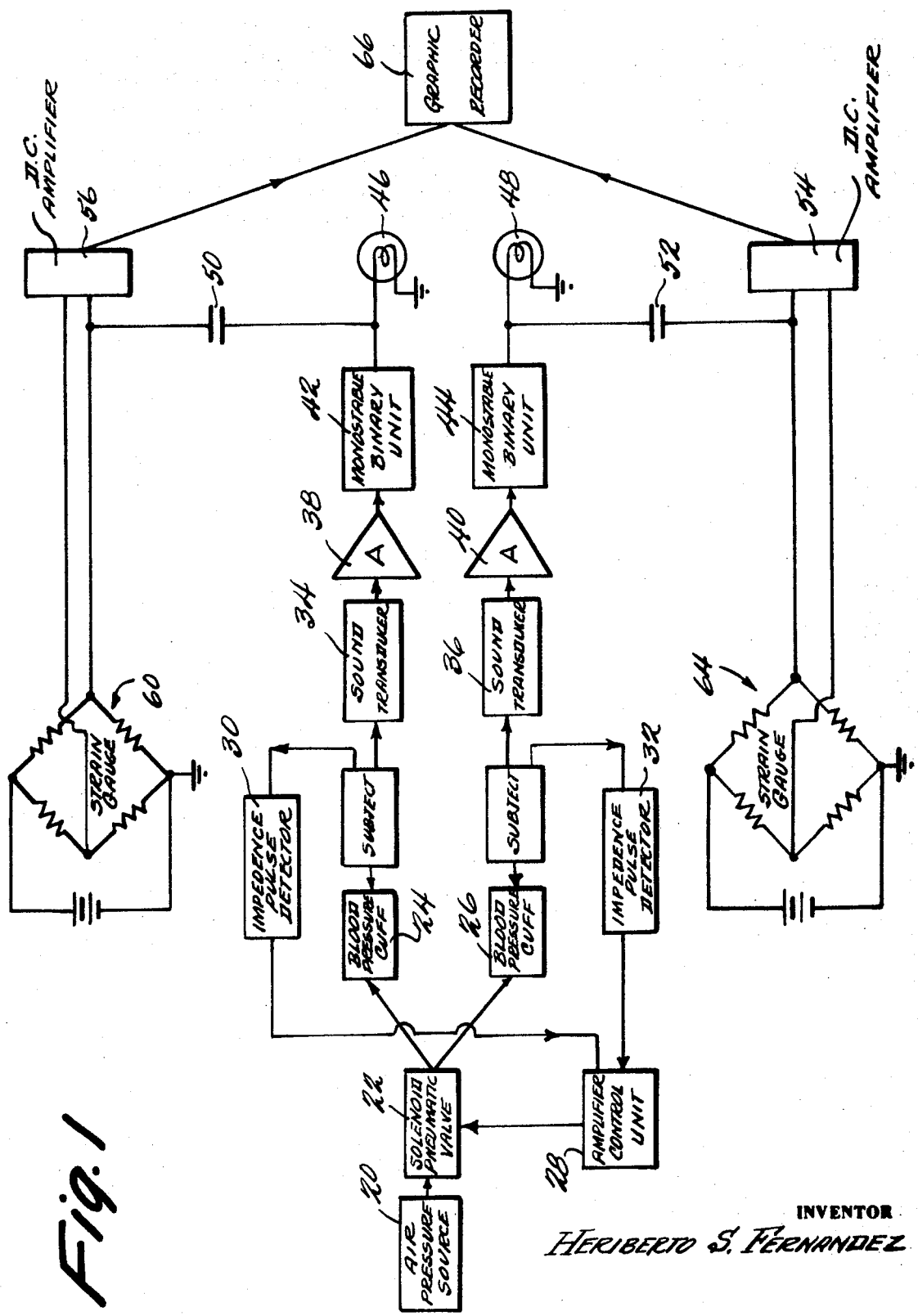

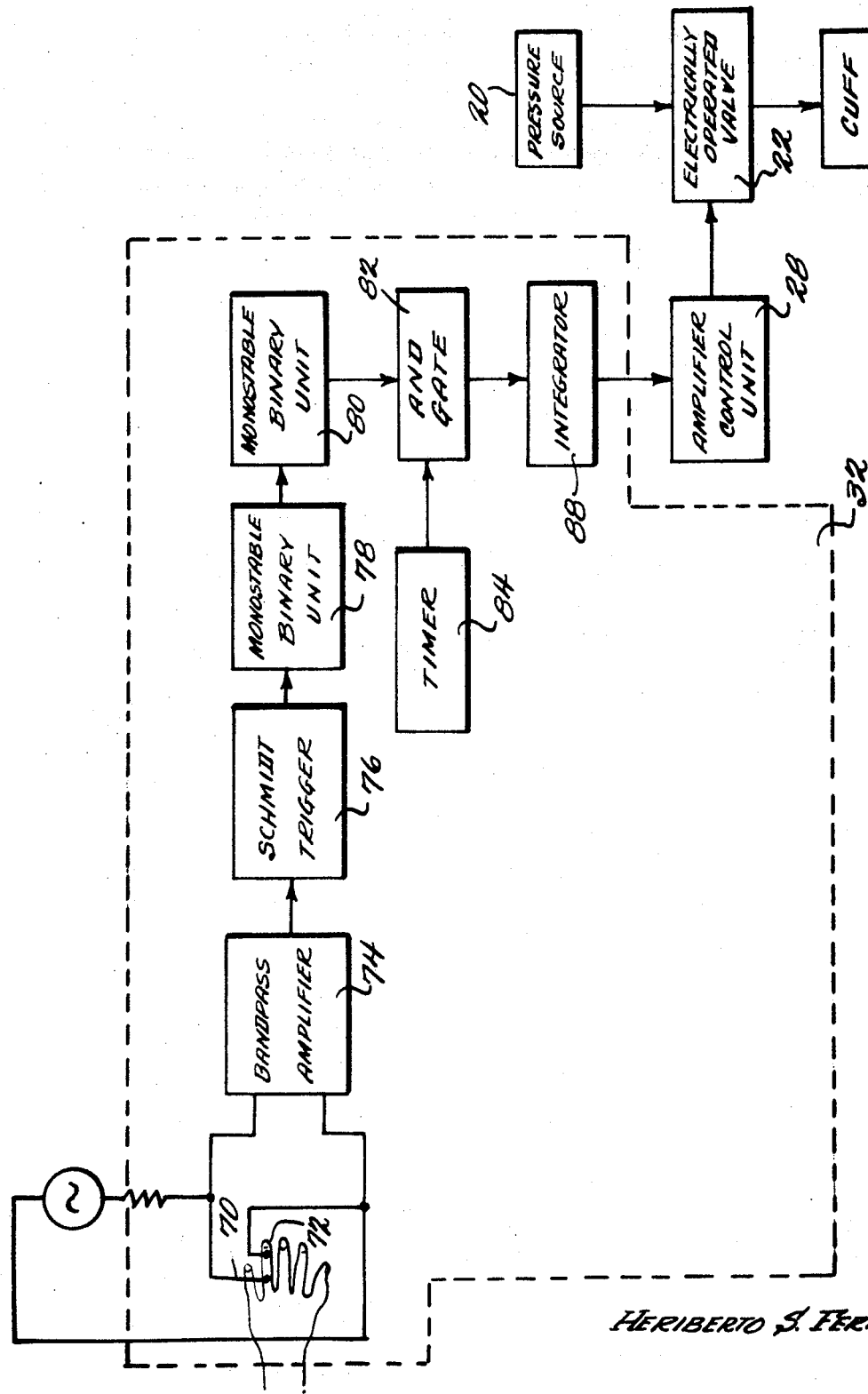

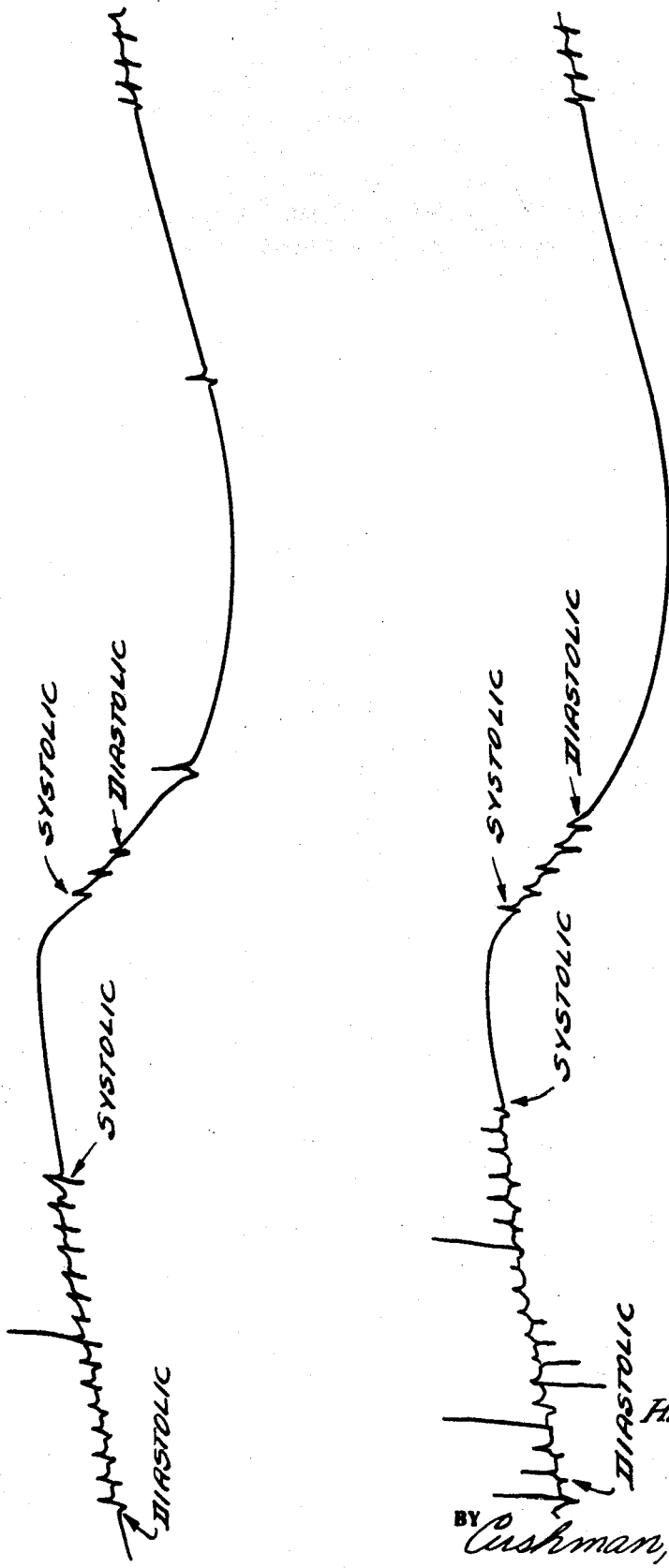

3,744,490

AUTOMATIC DEVICE FOR RECORDING BLOOD PRESSURE

BRIEF DESCRIPTION OF THE PRIOR ART AND SUMMARY OF THE INVENTION

The invention relates to an apparatus for producing a record systolic and diastolic blood pressures.

In the past, blood pressure has been measured at frequent intervals by using a hand inflated aneroid sphygmomanometer while listening for the Korotkoff sounds with a stethoscope. These sounds begin at the systolic pressure and substantially cease at the diastolic pressure so that these two pressures can be determined by ascertaining the pressures at which they begin and end. However, this latter technique has been cumbersome and at times inaccurate because of difficulty in hearing the sounds when the patient is hypotensive and because of the movement artifact which occurs if the patient is agitated during the test.

To overcome these problems which arise through the use of a stethoscope, various automatic devices for recording blood pressure have been developed. In an article entitled, "A Semi-Automatic Device for Recording Blood Pressure" by Heriberto Fernandez and Robert Robinson III which appeared in Vol. 6, No. 2, 1966 of *The American Journal of EEG Technology*, pages 63–65, one such automatic device is set forth, whereby the cuff is manually inflated with a sphygmomanometer. As it is deflated slowly, the sound transmitted by a microphone mounted under the cuff provides recordings of the Korotkoff sounds. These signals are superimposed upon the pressure curve which is generated by a strain gauge which measures cuff pressure. These two signals are applied to a graphic recorder so that the systolic and diastolic pressure can be ascertained quickly and simply from this recording.

Other devices in the prior art are known which automatically inflate and deflate a cuff and derive blood pressure readings during the increasing and decreasing pressure periods. The patent to Gilford, U.S. Pat. No. 2,827,040, for example, discloses an automatic sphygmomanometer including an inflatable cuff which is periodically inflated and deflated to obtain electrical signals at the diastolic and systolic pressures with these signals then recorded during the time when the diastolic pressure is increasing and when the systolic pressure is decreasing. The patent to Freyburger, U.S. Pat. No. 2,710,001, similarly shows an automatic blood pressure indicating device in which the pressure slowly increases to a maximum pre-determined pressure which is greater than the systolic pressure and thereafter the device gradually reduces that pressure. Other patents which show automatic measuring and recording of blood pressure include the Bolie U.S. Pat. No. 3,149,628, and the Gibson U.S. Pat. No. 2,379,573. Many other prior patents exist which show devices for automatically measuring and recording blood pressure.

The present invention relates to an apparatus such as generally described in the above-mentioned article and which incorporates at least two improvements which have been found to be particularly effective and satisfactory. According to one embodiment described below, the device includes structure for detecting the electrical impedance between two body locations, for example, on a single digit which is distal to cuff placement. This electrical impedance normally pulsates with the blood flow, but that pulsation is cut off by the inflated cuff at a pressure which is above systolic pressure. Accordingly, the impedance detection device includes a circuit which provides a first signal when the impedance is detected as pulsating, and a second signal when that impedance substantially stops pulsating. The first signal can be used to cause the valve which connects a high pressure source to the cuff to begin inflating the cuff and the second signal to end inflation and permit the cuff to gradually deflate.

According to a further aspect of this invention, the apparatus can be used to simultaneously produce a record of the systolic and diastolic pressures of several different individuals, each of which are provided with a cuff and with a single valve and valve control structure being used to simultaneously inflate each of the cuffs. Each of the cuffs is provided with a transducer such as a microphone for providing a signal indicating the detection of Korotkoff sounds and further with a strain gauge for producing a signal indicating the pressure of the cuff. The signals thus generated can be applied to different channels of a graphic recorder to simultaneously provide a record of both the systolic and diastolic pressures during both inflation and deflation for two or more individuals at the same time.

Many other objects and purposes of the invention will become clear from the following detailed description of the drawings.

BRIEF DESCRIPTION OF THE DRAWINGS

FIG. 1 shows a block diagram of one embodiment of the invention for simultaneously providing a graphical record of the systolic and diastolic blood pressure levels for two or more individuals.

FIG. 2 shows a block diagram of the impedance pulse detector of FIG. 1.

FIG. 3 shows a graph indicating the signals produced by the graphic recorder of FIG. 1 during both inflation and deflation of two cuffs.

DETAILED DESCRIPTION OF THE DRAWINGS

Reference is now made to FIG. 1 which shows a block diagram of one embodiment of the invention of this application. A conventional air pressure source 20 is coupled to a solenoid pneumatic valve 22 which has an open position permitting the air to flow into conventional blood pressure cuffs 24 and 26, and a closed position which blocks the flow into those cuffs and permits them to slowly deflate. The valve is operable between these two conditions by means of an electrical signal supplied to the valve by a conventional amplifier control circuit 28.

Amplifier control circuit 28 is adapted for receiving signals from two impedance pulse detectors 30 and 32, respectively, which are each associated with a different person and where each provide an output signal so long as pulsations of impedance can be detected in the subject. As mentioned above, such pulsations continue until the constriction of the blood flow by the associated cuff reaches a level which is above the systolic level at which the pulsations stop. Amplifier control circuit 28 simply includes logic which detects whether either of the pulse detectors 30 or 32 is providing a signal indicating that pulsations are still occurring and being detected. As long as either of these signals are being detected, a suitable signal is provided by control circuit 28 to valve 22 which causes that valve to couple source 20 to cuffs 24 and 26 to permit these cuffs to continue inflating.

When neither detector 30 nor detector 32 produces a signal indicating detection of further pulsations, then amplifier control circuit 28 ceases producing the signal which couples source 20 to cuffs 24 and 26 and these cuffs accordingly begin to deflate slowly.

A conventional sound transducer 34 is associated with the same body as cuff 24 and detects the Korotkoff sounds produced by that body between the systolic and diastolic pressures as discussed briefly above. This transducer may be mounted under blood pressure cuff for detecting brachial blood pressure readings or alternately on a finger for digital blood pressure readings. A similar sound transducer 36 is mounted in connection with cuff 26 for detecting the Korotkoff sounds produced by the subject wearing cuff 26 between the diastolic and systolic pressures. The electrical signals generated by transducers 34 and 36, which indicate the presence or detection of the Korotkoff sounds, are applied to conventional amplifiers 38 and 40, and the amplified signals then applied to a conventional pulse generating circuits 42 and 44, respectively circuits 42 and 44 each produce pulse trains which provide a sufficient voltage to keep the associated lamps 46 and 48 illuminated as long as the Korotkoff sounds are being detected.

Further, the outputs of circuits 42 and 44, respectively, are applied via capacitors 50 and 52, respectively, to D.C. amplifiers 54 and 56. Capacitors 50 and 52 provide adequate pulse signal level and good D.C. isolation. Amplifiers 54 and 56 also connected to conventional strain gauge circuits 60 and 64, respectively, which each provide an electrical D.C. signal indicating the pressure to which the associated cuffs 26 and 24 have been inflated. Thus, D.C. amplifiers 54 and 56 each provide a signal with the pulse trains generated by circuits 42 and 44 superimposed upon the cuff pressures and two such signals are shown in FIG. 3. These signals can then be recorded on adjacent channels of a conventional graphic recorder 66 with the systolic and diastolic pressures being readily ascertainable as the beginning and end of the Korotkoff sounds. Since the cuffs are inflated and deflated at a relatively low rate, the systolic and diastolic pressures during both inflation and deflation can be ascertained to provide a check and more accurate results as to the respective pressures.

Reference is now made to FIG. 2 which shows in detail the elements of impedance detector 32. It is understood that the elements of detector 30 are preferably similar. In this embodiment, two silver electrodes 70 and 72 are connected as shown on a digit of a hand, and connected in a bridge circuit such that a signal is generated which varies in accordance with the pulsating impedance between the two electrodes. This signal is amplified in amplifier 74 and applied to a conventional Schmidt trigger 76 which in turn applies its output to monostable binary circuits 78 and 80 such that the output of binary circuit 80 is a pulse train which continues as long as the pulsating impedance between the two digits to which electrodes 70 and 72 are attached continues. This pulse train is applied to an AND gate 82 together with the output of a conventional timer 84 which operates to initiate the inflation and provide an enabling signal to gate 82 for a time interval greater than that necessary for the cuff to inflate and deflate.

The output of AND gate 82 is applied to an integrator circuit 88 which in turn applies its output to an amplifier control circuit 28, as discussed above, which provides a signal to cause electrically operated valve 22 to permit the cuff or cuffs to continue inflating so long as pulses are being detected. When the output of integrator 88 drops below a given level, amplifier control unit 28 ceases providing this signal and electrically operated valve 22 interrupts the connection between source 20 and cuffs 24 and 26 so that the cuffs slowsly deflate. After deflation, if timer 84 is still providing its enabling signal, AND gate 82 again passes the pulse train to integrator 88 so that the signal level quickly builds up to a value so as to cause unit 28 to again provide its output signal which in turn causes valve 22 to re-inflate cuffs 24 and 26. Thus, the system automatically provides a number of systolic and diastolic, for example four, in succession without the need for manual intervention.

It should be apparent from the above discussion of the invention that while the embodiment of FIG. 1 is most advantageously used to simultaneously detect and record a number of blood pressures of a plurality of individuals, it can, of course, be used with a single system in which a single cuff impedance detector, sound transducer, amplifier, and monostable binary unit are employed as well as the single strain gauge, coupling capacitor, and D.C. amplifier.

Many other changes and modifications in the above embodiments of the invention can be made without departing from the scope of the invention and accordingly that scope is intended to be limited only by the scope of the appended claims.

What is claimed is:

1. Apparatus for producing a record of systolic and diastolic blood pressure comprising:

an inflatable blood pressure cuff adapted for placement on a part of the body so that inflation of said cuf constricts blood flow through that part and causes the Korotkoff sounds to appear at roughly the diastolic pressure and disappear at roughly the systolic pressure and valve means for connecting said cuff to a source of air pressure, to inflate said cuff and for deflating said cuff, valve control means for causing said valve means to permit air to flow into and inflate said cuff until a pressure in excess of systolic pressure is reached and then to deflate said cuff, including means for detecting the electrical impedance between two body locations adjacent said cuff placement including first and second electrodes, means for generating a signal on said electrodes, a pulse generating circuit connected to said electrodes for producing an electrical pulse train while said impedance is pulsating, means fo receiving and integrating said pulse train, control circuit means connected to said valve control means for receiving said integrated signal and producing a signal for causing said valve means to inflate said cuff when said integrated signal exceeds a given valve for causing said valve means to deflate said cuff when said integrated signal is less than a given valve, timer means periodically operable to inflation of said cuff and gate means connected to said timer means and connecting said pulse train producing means to said integrating means for passing said pulse train to said receiving and integrating means while said timer is operable, means for producing a first signal while said cuff is inflating and said impedance is pulsating and a second signal when said impedance substantially stops pulsating, means responsive to said first signal to cause inflation and means responsive to said second signal to cause deflation, transducer means, adapted for placement to detect the Korotkoff sounds, for producing a Korotkoff signal indicating whether the Korotkoff sounds are being producted, means for sensing cuff pressure, and means connected to said sensing means and to said transducer means for recording cuff pressures and said Korotkoff signal during both inflation and deflation.

2. Apparatus as in claim 1 wherein said transducer means includes means for producing an electrical pulse train while said Korotkoff sounds are being produced so that the beginning of said pulse train indicates diastolic pressure and the end of said pulse train systolic pressure.

3. Apparatus as in claim 2 wherein said recording means includes means for producing a graphical record.

4. Apparatus as in claim 1 including timer means for initiating inflation of said cuff and for causing reinflation after deflation so as to produce at least four diastolic and systolic blood pressure readings, two during inflation and two during deflation.

5. Apparatus as in claim 1 wherein said cuff pressure sensing means includes a strain gauge connected to said cuff for producing an electrical signal indicating the pressure of said cuff and wherein said recording means includes means for receiving and recording said pressure signal.

6. Apparatus as in claim 1 further including a second inflatable blood pressure cuff adapted for placement on a part of a second body so that inflation of said second cuff constricts blood flow through that part and causes the Korotkoff sounds to appear at roughly the diastolic pressure and disappear at roughly the systolic pressure, means connecting said second cuff to said valve means so that said second cuff inflates and deflates with said first cuff, and second transducer means adapted for placement on said second body to detect the Korotkoff sounds of said body and for producing a second body Korotkoff signal indicating whether the Korotkoff sounds are being produced and wherein said recording means includes means for also recording said second body Korotkoff signal and said second cuff pressure.

7. Apparatus for producing a record of systolic and diastolic blood pressure comprising:

an inflatable blood pressure cuff adapted for placement on a part of the body so that inflation of said cuff constricts blood flow through that part and causes the Korotkoff sounds to appear at roughly the diastolic pressure and disappear at roughly the systolic pressure and valve means for connecting said cuff to a source of air pressure, to inflate said cuff and for deflating said cuff, valve control means for causing said valve means to permit air to flow into and inflate said cuff until a pressure in excess of systolic pressure is reached and then to deflate said cuff, including means for detecting the electrical impedance between two body locations adjacent said cuff placement, means for producing a first signal while said cuff is inflating and said impedance is pulsating and a second signal when said impedance substantially stops pulsating, means responsive to said first signal to cause inflation and means responsive to said second signal to cause deflation, transducer means, adapted for placement to detect the Korotkoff sounds, for producing a Korotkoff signal indicating whether the Korotkoff sounds are being produced including a microphone, means connected to said microphone for producing an electrical pulse train while said Korotkoff sounds are being produced, a D.C. amplifier connected to said strain gauge means for receiving said signal indicating cuff pressure, and a capacitor connecting said pulse train producing means to said D.C. amplifier, strain gauge means connected to said cuff for producing an electrical signal indicating cuff pressure, and means connected to said strain gauge and to said transducer means for recording cuff pressures and said Korotkoff signal during both inflation and deflation including a graphic recorder connected to the output of said D.C. amplifier.

* * * * *